United States Patent
Remy

[15] 3,641,939
[45] Feb. 15, 1972

[54] SPEED CONTROL SYSTEM FOR LINEAR MOTOR CONVEYORS

[72] Inventor: Emmanuel M. Remy, Grenoble, France

[73] Assignee: Merlin Gerin, Societe Anonyme, Grenoble, France

[22] Filed: Sept. 16, 1969

[21] Appl. No.: 858,319

[30] Foreign Application Priority Data
Oct. 17, 1968 France..................................170196
May 22, 1969 France.....................................16834

[52] U.S. Cl..........................................104/148 LM, 310/13
[51] Int. Cl..................B60l 13/00, B61b 13/08, H02k 41/02
[58] Field of Search..............................310/12, 13; 318/135; 104/148 LM; 180/7 FS

[56] References Cited
UNITED STATES PATENTS 3,125,964   3/1964   Silverman..................................310/12
3,158,765   11/1964  Polgreen....................................310/12
3,233,559   2/1966   Smith et al.........................104/148 LM
3,385,228   5/1968   Kwangho Chung.............104/148 LM

*Primary Examiner*—Drayton E. Hoffman
*Attorney*—Stevens, Davis, Miller & Mosher

[57] ABSTRACT

Speed control system for linear induction motors in transportation devices or conveyors wherein the gap of the linear motor or of the active surfaces of the motor are varied. Control means modify the spacing of the magnetic cores defining the gap of the motor. Load-detecting means govern the control means to automatically change the gap and the output of the motor to obtain constant speed.

10 Claims, 9 Drawing Figures

PATENTED FEB 15 1972

INVENTOR
EMMANUEL M. REMY

BY Stevens, Davis, Miller & Mosher

ATTORNEYS

SPEED CONTROL SYSTEM FOR LINEAR MOTOR CONVEYORS

The present invention relates to a system for regulating the speed of propulsion of a trolley or truck supporting a load which moves along a given path defined in particular by a track, under the action of a linear electric induction motor.

The use of linear induction motors in handling or transportation devices, particularly of the conveyor type, is becoming more and more frequent due to the remarkable properties of strength and propulsion independent of the adherence of the wheels to the track exhibited by this type of motor. Another advantage of the linear motor is that it is particularly well adapted to the propulsion of independent trucks of the self-propelled type, a large number of which can travel on one and the same track. As the trucks are no longer connected together by a chain or other connecting device their frequency and speed of travel can be any desired and are best adapted to the operating conditions. This flexibility in operation which is uncustomary and of particular interest nevertheless raises the problem of regulating or controlling the speed of the different trucks in such a manner as to avoid telescoping or crowding of the trucks so as to impose excessive overloads on the track. An object of the present invention is to provide a simple and effective solution for this problem.

In an electric motor, the arrangement of the different elements is determined so as to obtain maximum output and it is easy to understand that this output and therefore the power and the thrust available may be decreased by the variation of certain parameters such as the gap or the active surfaces. The invention is based on the discovery that in a linear motor, contrary to a rotary motor, it is particularly easy to modify the gap or the active surfaces of the motor so as to control its output and therefore the driving power.

The speed-regulating system in accordance with the present invention is characterized by the fact that the means for the fastening of the element of the linear motor borne by the trolley to the latter are adapted to permit a lateral displacement—referred to the direction of displacement of the said trolley—to or away from the other element of the motor which is rigidly connected with the track, means being provided to control the said lateral displacement.

Propulsion systems of the type indicated are used for instance for the displacement of trucks or vehicles on a track of a handling installation and it will be understood that depending on the load transported the trucks advance with greater or lesser speed, all other factors being equal. Particularly in the case of empty and full trucks travelling on one and the same track, the empty trucks which are faster catch up with the loaded trucks and cause telescoping.

Another object of the present invention is to overcome this drawback and to provide a particularly simple device which makes it possible to maintain a substantially constant speed whatever the load transported.

In accordance with one embodiment of the invention, each truck comprises means for detecting the load borne by the said truck which govern the said control means in such a manner as to make the said thrust exerted by the said linear propulsion motor correspond to the said load.

The value of the load may be detected by weighing and more particularly by deformation of an elastic element such as a spring, the variation in length of which can be used directly to cause the variations in the said parameters of the motor. Of course, this detection can be effected in some other manner, for instance by measurement of a level or, in the case of an "all or nothing" measurement, by detection of the presence or absence of a load.

In linear motor conveyors the speed of travel of the trucks may be high and in certain parts of the circuit it is necessary to slow the load-bearing trucks down, in particular to pass along curves of small radius and through switches or in the loading or unloading zones.

In general such a deceleration can be obtained directly by variation of the frequency of the feed current of the motor. One can also feed the motor under reduced voltage when it passes through the zones of low speed and in this case one then acts indirectly by decreasing the thrust and therefore increasing the slip. However this may be, these two methods employ a special wiring of the deceleration zone which must be electrically separate from the rest of the circuit and make necessary the use of a frequency generator or else of a transformer.

Another object of the invention is to overcome this drawback and to provide a simple speed-regulating device on certain sections of the handling track.

The motor may be of any type with a magnetic field structure such as a movable inductor borne by the truck cooperating with a stationary armature connected with the track or conversely where the magnetic field structure is a stationary inductor with armature fastened to the truck. It may have a double U-shaped face or a single face or any other type well known to those skilled in the art. Likewise, the speed-regulating device in accordance with the invention is in no way limited to any particular type of conveyor or handling device and it is obvious that the embodiment more particularly described below with respect to an overhead conveyor is applicable to any other conveyor and in particular to trucks moving on a track arranged on the ground and vice versa.

Other advantages and characteristics will become evident from the description given below of various embodiments of the invention, given by way of illustration and not of limitation, and shown in the accompanying drawings in which.

Figure 2:
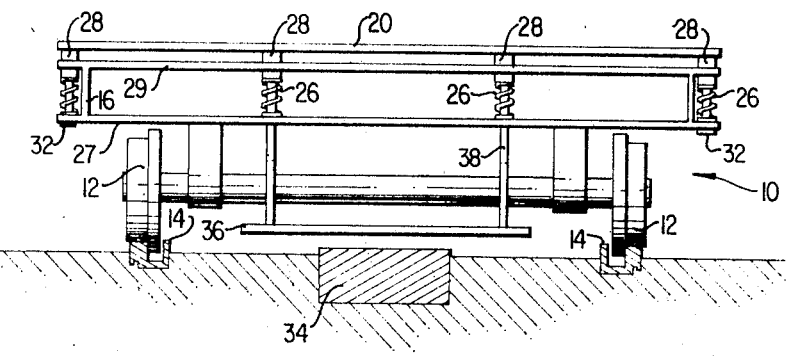
FIG. 2 is an end view on a larger scale of a truck according to FIG. 1 with elastic supporting system for the platform comprising coil springs.
Figure 3:
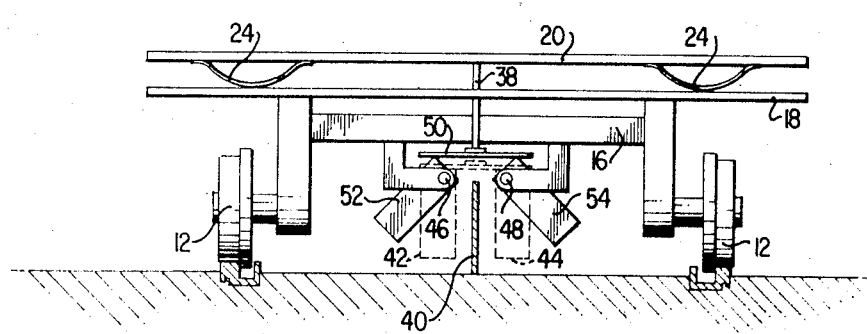
FIG. 3 is a view similar to that of FIG. 2 of a variant embodiment of the invention with U-shaped motor with variable gap.
Figure 4:
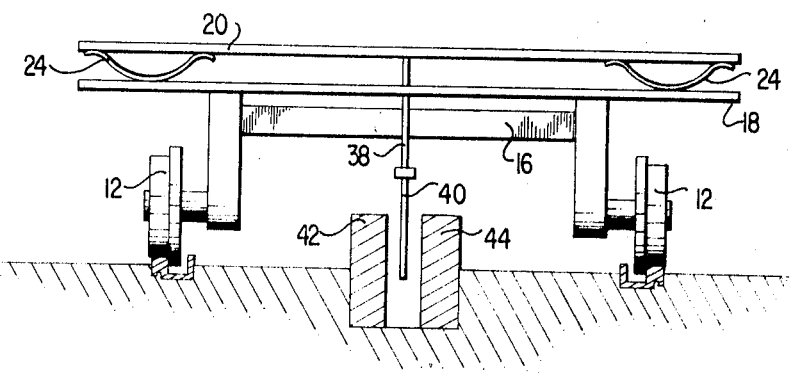
Figure 5:
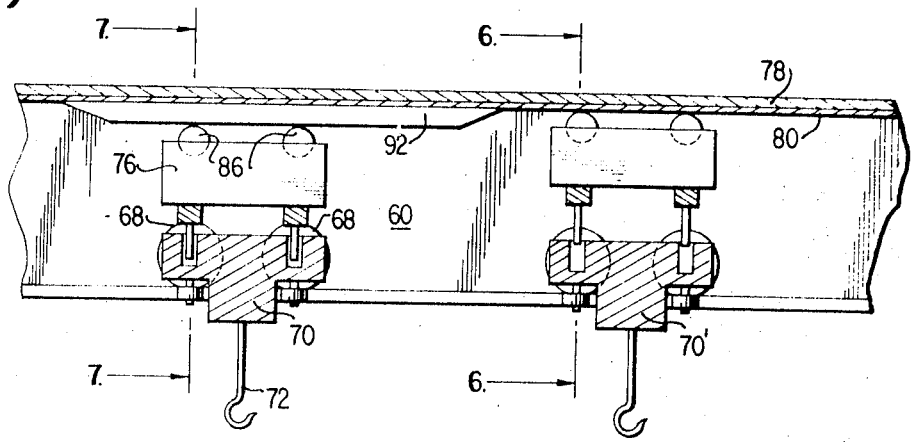
Figure 6:
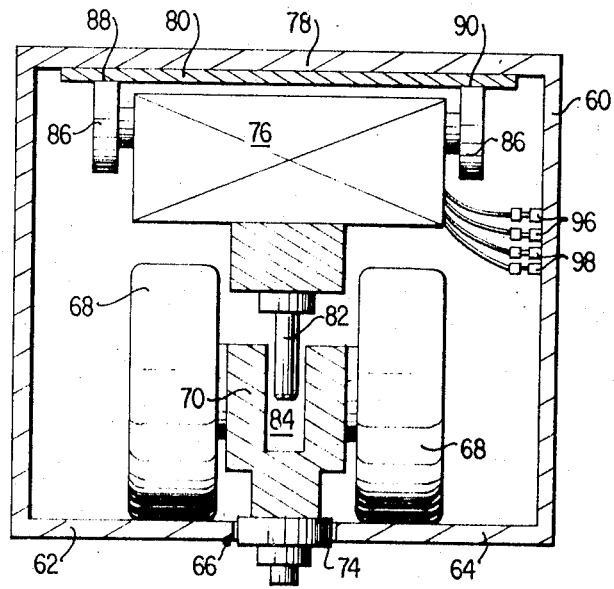
Figure 7:
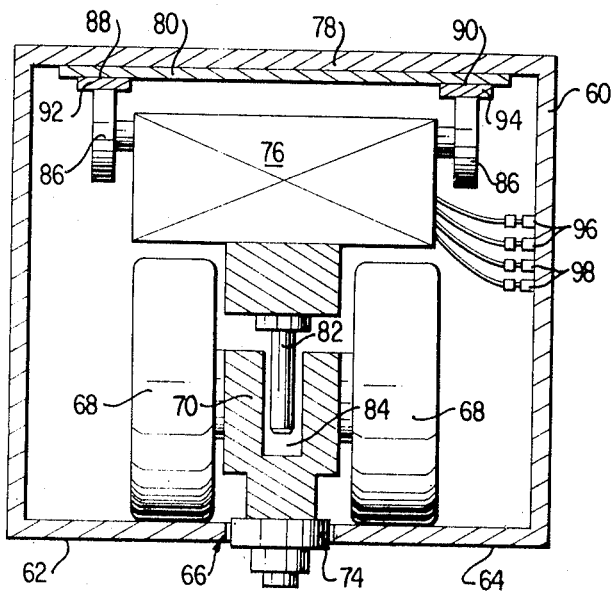
Figure 8:
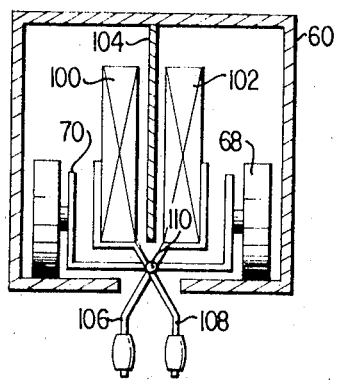
Figure 9:
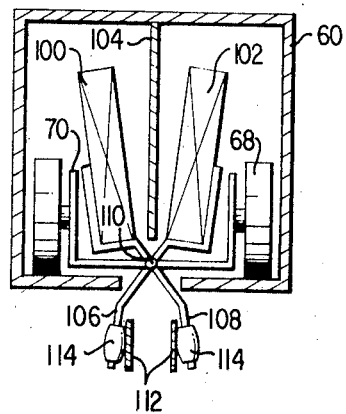

FIG. 4, similar to FIGS. 2 and 3, represents another variant with variable penetration of the armature into the gap of the motor;

FIG. 5 is a diagrammatic view of an overhead conveyor with speed-regulating device in accordance with the invention along certain sections of the track;

FIG. 6 is a section along the line 6—6 of FIG. 5;

FIG. 7 is a section along the line 7—7 of FIG. 5;

FIGS. 8 and 9 are views similar to FIGS. 6 and 7 illustrating a variant embodiment of the invention.

For reasons of the clarity of the figures and of the description, the same reference numbers have been used in the different figures for identical or similar parts.

Figure 1:
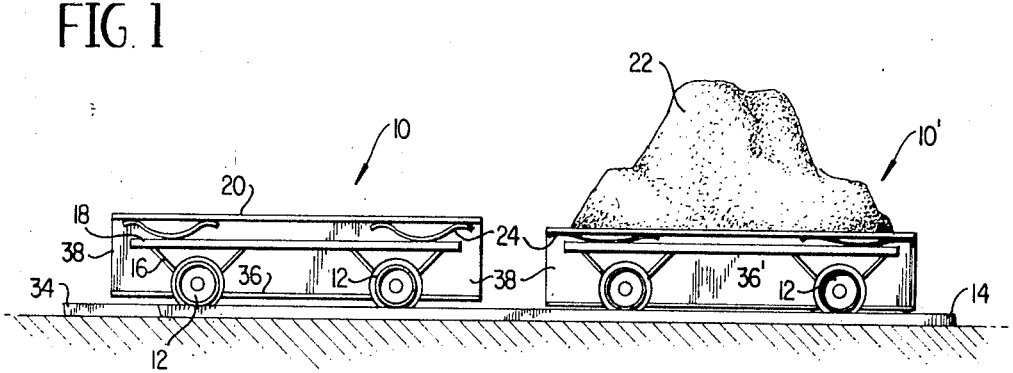
FIG. 1 is a schematic view of a speed-regulating device in accordance with the invention applied to a ground-track handling system with trucks bearing different loads.

In FIGS. 1 and 2, trucks 10, 10' of a handling system comprise a frame 16 provided with rollers 12 travelling on a track 14 of a closed or open handling circuit on which there travel the trucks 10, 10'. The upper portion of the frame 16 is shaped as a flat supporting surface 18 over which there is arranged a platform 20 capable of receiving a load 22 and supported elastically by the frame 16.

In FIG. 1, the elastic system for the supporting of the platform 20 is indicated schematically by leaf springs 24 inserted between the surface 18 and the platform 20. Under the effect of the load 22, the platform 20 approaches or comes to rest on the surface 18. Any other supporting system can of course be used and FIG. 2 shows a suspension by coil springs 26 inserted between the flanges 27 and 29 of channel irons placed on edge and constituting the frame 16, on which the platform 20 rests via collars 28 which pass through orifices provided in the upper flange 29 of the channel irons. The springs 26 urge the platform 20 upward, the stroke being limited by coaxial bolts 32 within the springs 26 which bolts pass through the lower flange 27 and are fastened to the collars 28. In the raised position of the platform 20, the head of the bolts 32 strikes against the flange 27. Each truck 10, 10' is propelled by a linear motor, the inductor element 34 of which is rigidly connected with the track and extends along the path. In the embodiment shown in FIGS. 1 and 2, the motor is of the flat type, the inductor 34 having a horizontal gap surface opposite which there is arranged an armature plate 36, 36' borne by the truck 10, 10'. The armature 36 is rigidly connected with the platform 20 by support rods 38 of such a length that in the position of maximum flexing of the springs 24 or 26, the gap provided between the armature 36 and the inductor 34 has a minimum value compatible with good operation of the system. It is easy to see that if one increases the load 22 of the truck 10, 10' the springs 24 or 26 will flex, and platform 20 with the armature 36 which is rigidly connected with it, will descend and approach the inductor 34. The drive thrust is thereby increased as a function of the load 22 and the characteristics of the springs and of the motor may be adapted to a precise compensating of the increase of the resistance to advance by an increase of the driving thrust. This regulation of the thrust as a function of the load may be continuous or, in the case of constant loading, certain trucks being empty and others loaded, it may be of the "all on or all off" types so that the empty trucks of large gap move at the same speed as the loaded trucks with small gap. It should be noted that the variation in the drive thrust by variation of the gap is extremely simple and permits a large range of variation of the thrust.

The inductor 34 can of course be rigidly connected with the truck 10 and the armature 36 fastened to the track 14 without the operation of the arrangement being affected thereby. FIG. 3 shows a fixed-armature motor 40 in the form of a rail or vertical plate surrounded on both sides by inductor elements 42, 44 borne by the truck 10, The elements 42, 44 are pivotally mounted on longitudinal pins 46, 48 of the frame 16 and are capable of moving towards and away from each other under the control of a plate 50 cooperating with protrusions or noses 52, 54 of the upper face of the inductor elements 42, 44 in such a manner that a descending and ascending movement of the plate 50 causes a moving together and moving apart respectively of the parts 42, 44 and therefore a decrease or an increase of the gap of the motor. The control plate 50 is borne by the rods 38 which are rigidly connected with the platform 20 and it follows from what has been stated above that a variation in the load borne by the platform 20 produces a variation of the gap and therefore of the thrust of the motor. The transmission of the movement of the platform 20 to the inductor elements 42, 44 can obviously be effected in any other mechanical, pneumatic or electrical manner without going beyond the scope of the invention. The variation of the gap can of course result from a motion of translation.

FIG. 4 illustrates a variant in accordance with the invention in which the inductor elements 42, 44 are rigidly connected with the track 14, the armature plate 40 being fastened by means of support rods 38 to the platform 20. Depending on the load and therefore the position of the platform 20 with respect to the frame 16 of the truck 10, the armature 40 is inserted to a greater or lesser depth in the gap provided between the inductors 42, 44. In this variant, use is made of the variation of the drive thrust as a function of the magnetic flux intercepted by the armature 40 which extends into the gap. This variation can of course result from a pivoting movement of the armature or from a subdividing of the armature into different elements of which a larger or smaller number are introduced into the gap.

The arrangement of the invention is particularly interesting in the case of a constant load, a truck being either loaded or empty, and the platform 20 therefore assuming one of the two extreme positions, namely resting on the surface 18 or raised. This system does not require any precise spring adjustment or calibration and the two values of the drive thrust may be easily adapted to the resistance to advance of the empty trucks and full trucks. The presence of a load can be detected in any desired manner and the control be transmitted mechanically, hydraulically or electrically.

The invention is of course applicable to conveyors of a different type, for instance with overhead track as shown in FIGS. 5 to 9, in connection with which there will be described below a speed adjusting device in accordance with the invention on sections of the track.

In FIGS. 5 to 9, a track 60 of semiclosed cross section has at its base two horizontal flanges 62, 64 spaced apart by a gap 66, forming a double runway for rollers 68 of trucks 70, 70', etc.; which are adapted to move within the track 60. A supporting member for a load (not shown) which is schematically illustrated by a hook 72, passes through the gap 66 in which there can be engaged a guide roller 74 for the displacement of the truck along the track 60. Such conveyors are well known and it is therefore unnecessary to describe them in detail.

In FIGS. 5 to 7, each truck 70, 70' bears an inductor 76 of a linear induction motor with pole surface opposite the upper part or top 78 of the track 60 which serves as armature so that the truck 70 is propelled along the track 60 when the inductor 76 is fed with polyphase current. A conductive plate 80 for instance of copper or aluminum can be pressed against the wall 78 opposite the inductor 76 if the conductive properties of the material of the track 60 are insufficient for the satisfactory operation of the motor.

The inductor 76 is connected to the truck 70 by one or more rods or posts 82 which fit freely in a vertical hole 84 in the frame of the truck 70 so as to permit an ascending and descending movement of the inductor 76 with respect to the truck 70 and thereby the moving apart and together of the inductor 76 and the armature 80.

The inductor 76 bears positioning rollers 86 which protrude upward from the pole surface and cooperate in the raised position of the inductor 76 (see FIG. 6) with the side edges 88, 90 of the armature 80 so as to maintain the upper face of the inductor 76 at a distance from the plate 80 which is suitable for the satisfactory operation of the motor. On certain noses of the track 60, the side edges 88, 90 of the armature 80 which form runways for the positioning rollers 86 are arranged as cam 92, 94 protruding downward so as to space the inductor 76 from the armature 80, this descending movement being permitted by the sliding of the posts 82 in the holes 84.

The operation of the conveyor of FIGS. 5 to 7 is as follows:

The inductor 76 which is suitably fed from bar 96 by brushes 98, forms a linear motor with the armature 80 borne by the track 60. The force of attraction which acts between the inductor 76 and the armature 80 assures the raising of the inductor in opposition to its weight and possibly the action of springs (not shown) until the rollers 86 come into contact with the runways 88 and 90 provided under the top of the track 60. The gap of the motor is therefore determined precisely and it is maintained at this optimum value (see FIG. 6) until the moment when the truck 70 enters a section of track equipped with cams 92, 94 which then result in a lowering of the inductor 76 and an increase in the gap, the reduced thrust being retained during the entire travel of the truck in this section (see FIG. 7).

FIGS. 8 and 9 illustrate a variant embodiment of the invention with truck 70 equipped with an inductor divided longitudinally into two spaced portions 100, 102 between which there is engaged an armature plate 104 fastened at its upper edge edgewise to the ceiling of the track 60 and extending in the vertical axial plans. The two portions or semi-inductors 100, 102 are rigidly connected with two supports 106, 108 respectively pivotally mounted on a longitudinal horizontal pin 110 borne by the truck 70.

Each of the two semi-inductors 100, 102 may be moved away from the stationary armature 104 at any desired place of the track 60 by the action of a cam surface 112 fastened to the lower portion of the track and via a roller 114 pushing away laterally the support 106 or 108 of the corresponding inductor.

In operation the two semi-inductors 100, 102 are brought towards each other by the force of electromagnetic attraction of the motor or by any other means in all the zones of the track 60 which are not provided with cams 112. On the other hand, in the zones where such cams 112 are present, for instance in switching zones or zones of descending slope, the semi-inductors 100, 102 are moved away from each other and at the same time moved away from the armature 104 so that the characteristics of the motor are modified so as to decrease the output and therefore reduce the speed of advance of truck 70 in the said zones.

It is easy to see that the speed-regulating device in accordance with the invention is particularly well adapted in handling or transportation systems.

Of course, the invention is not limited to the embodiments which have been described and shown, they having been given only by way of example, and numerous changes may be made therein in accordance with the specific applications in view without thereby going beyond the scope of the invention.

What is claimed is:

1. A propulsion force control system for a vehicle having a rolling frame rolling on a trackway under the action of a linear electric motor including a magnetic field structure and an armature structure, one of said structures being carried by said vehicle and the other structure extending along said trackway, said structures having spaced-apart confronting end faces, said magnetic field structure producing a moving magnetic field between said end faces to cause said vehicle to be propelled by electromagnetic forces, said system comprising guide means on said vehicle to guide said one structure for movement relative to said rolling frame and to said other structure, and control means extending along at least portions of said trackway and operatively connected to said one structure to vary the relative position of said confronting end faces along said trackway thereby to vary said electromagnetic forces according to the location of said vehicle on said trackway.

2. A propulsion force control system for a vehicle guided by a trackway under the action of a linear electric motor including a magnetic field structure and an armature structure, one of said structures being carried by said vehicle and the other structure extending along said trackway, said structures having spaced-apart confronting end faces, said magnetic field structure producing a moving magnetic field between said end faces to cause said vehicle to be propelled by electromagnetic forces, said system comprising guide means on said vehicle to guide said one structure for movement relative to said vehicle transversely of the direction of said trackway to vary the relative position of said end faces, and stationary control means extending along at least portions of said trackway and operatively connected to said one structure to control said relative position thereby to vary said electromagnetic forces according to the location of said vehicle on said trackway independently of the spacing of said vehicle from said trackway.

3. A system as claimed in claim 2, said one structure comprising follower means; said control means comprising shaped guide rails extending along at least portions of said trackway to guide said follower means so as to schedule said relative position of said end faces by urging said one structure against the action of electromagnetic attraction forces acting between said structures under the influence of said magnetic field.

4. A system as claimed in claim 3, said follower means comprising roller means.

5. A system as claimed in claim 2, said magnetic field structure being carried by said vehicle and comprising a pair of magnetic field elements having confronting pole faces and supported for relative movement of said pole faces towards and away from each other, said armature structure comprising a stationary armature plate extending between said pole faces and along said trackway, said control means comprising stationary guide rails operatively connected to said magnetic field elements to vary the relative position of said pole faces with respect to the armature plate.

6. A system as claimed in claim 5, said magnetic field elements being pivotally mounted on said vehicle, said guide rails varying the angular position of at least one of said magnetic field elements.

7. A propulsion force control system for a load carrying vehicle guided by a trackway under the action of a linear electric motor including a magnetic field structure and an armature structure, one of said structures being carried by said vehicle and the other structure extending along said trackway, said structures having spaced apart confronting end faces, said magnetic field structure producing a moving magnetic field between said end faces to cause said vehicle to be propelled by electromagnetic forces, said system comprising support means on said vehicle to support said one structure for movement relative to said vehicle independently of the vertical spacing of said vehicle from said trackway and transversely of the direction of said trackway to vary the relative position of said end faces, and load responsive control means operatively connected to said support means to positively control said relative position thereby to vary said electromagnetic forces responsive to the value of said load carried by said vehicle.

8. A system as claimed in claim 7, said load-responsive control means comprising resilient means stressed by said load.

9. A system as claimed in claim 8, said magnetic field structure being carried by said vehicle and comprising a pair of pivotally mounted magnetic field elements having confronting pole faces, said armature structure comprising a stationary armature plate extending between said pole faces and along said trackway, said control means varying the angular position of said magnetic field elements with respect to said armature plate.

10. A propulsion force control system for a load-carrying vehicle having a frame rolling on a trackway under the action of a linear electric motor including a magnetic field structure and an armature structure, one of said structures being carried by said vehicle and the other structure extending along said trackway, said structures having spaced apart confronting end faces, said magnetic field structure producing a moving magnetic field between said end faces to cause said vehicles to be propelled by electromagnetic forces, said vehicle comprising support means to resiliently support said load and said one structure from said frame so as to vary the relative position of said one structure with respect to said frame and thus of said confronting end faces thereby to schedule the value of said electromagnetic forces as a function of the value of said load carried by said vehicle.

* * * * *